US009756411B2

(12) United States Patent
Grainger

(10) Patent No.: US 9,756,411 B2
(45) Date of Patent: Sep. 5, 2017

(54) HARMONICA MICROPHONE WITH IMPROVED CONTROL OF AUDIO FEEDBACK

(71) Applicant: Mitchell Grainger, Los Angeles, CA (US)

(72) Inventor: Mitchell Grainger, Los Angeles, CA (US)

( * ) Notice: Subject to any disclaimer, the term of this patent is extended or adjusted under 35 U.S.C. 154(b) by 0 days.

(21) Appl. No.: 15/153,271

(22) Filed: May 12, 2016

(65) Prior Publication Data

US 2016/0337736 A1 Nov. 17, 2016

Related U.S. Application Data

(60) Provisional application No. 62/160,498, filed on May 12, 2015.

(51) Int. Cl.

| | |
|---|---|
| ***G01D 7/12*** | (2006.01) |
| ***H04R 1/08*** | (2006.01) |
| ***G10G 5/00*** | (2006.01) |
| *G10D 7/12* | (2006.01) |

(52) U.S. Cl.

CPC ............... *H04R 1/08* (2013.01); *G10G 5/005* (2013.01); *H04R 1/086* (2013.01); *G10D 7/123* (2013.01)

(58) Field of Classification Search

USPC ............................................................ 84/379

See application file for complete search history.

(56) References Cited

U.S. PATENT DOCUMENTS

| | | | | |
|---|---|---|---|---|
| 2,664,775 | A | 1/1954 | Zielinski | |
| 2,945,408 | A * | 7/1960 | Terlinde | G10D 7/123 84/378 |
| 4,091,704 | A * | 5/1978 | Moe | G10D 7/123 84/378 |
| 4,287,803 | A | 9/1981 | Zema | |
| 4,397,213 | A * | 8/1983 | Hubbard | G10D 7/123 84/379 |
| 4,545,277 | A | 10/1985 | Strnad | |
| 6,462,261 | B1 | 10/2002 | Smith | |
| 8,450,588 | B2 * | 5/2013 | Applegate | G10D 7/123 84/379 |
| 8,729,373 | B2 | 5/2014 | Quealy et al. | |
| 8,993,864 | B1 * | 3/2015 | Cramer | G10G 5/005 84/379 |

(Continued)

OTHER PUBLICATIONS

International Search Report and Written Opinion Issued Aug. 16, 2016, for PCT/US2016/032095.

*Primary Examiner* — Christopher Uhlir

(74) *Attorney, Agent, or Firm* — David H. Jaffer; Pillsbury Winthrop Shaw Pittman LLP

(57) ABSTRACT

A hands-free harmonica microphone for controlling undesired audio feedback, the microphone comprising: a reflective curved microphone chamber, a harmonica mount, a transducer, associated electronics and a neck brace attachment apparatus for connecting the microphone to commercially available harmonica holders (neck braces). In one embodiment, the harmonica mount is detachably coupled (magnetically or otherwise) to the microphone chamber. In another embodiment, the harmonica mount is integrated to the microphone chamber so that is also possible to mount the harmonica directly onto the microphone chamber.

18 Claims, 6 Drawing Sheets

(56) References Cited

U.S. PATENT DOCUMENTS

| | | | | |
|---|---|---|---|---|
| 2013/0047817 | A1* | 2/2013 | Kaynor | G10G 5/005<br>84/379 |
| 2014/0053706 | A1* | 2/2014 | Quealy | G10D 7/123<br>84/377 |

* cited by examiner

HARMONICA MICROPHONE WITH IMPROVED CONTROL OF AUDIO FEEDBACK

RELATED APPLICATIONS

This application claims priority to U.S. Provisional Patent Application Ser. No. 62/160,498 filed May 12, 2015, which hereby incorporated by reference in its entirety.

BACKGROUND

Technical Field

Embodiments of the present invention relate to microphone technology, specifically in relation to the sound amplification of certain musical instruments, such as harmonica. The disclosed embodiments facilitate hands-free use of such microphones allowing the musician to play multiple instruments simultaneously, while performing, practicing, and/or recording.

Background Art

Control of audio feedback is important in live performances and studio recording situations, where microphones are used to capture the sound of various musical instruments. For example, a musician may be playing a harmonica and other musical instruments during a performance. Harmonica players have always struggled with audio feedback loops, i.e. the cacophonous screeching and humming noise of certain sound frequencies looping between the microphone and the amplification circuit, many times per second. The amplification of the harmonica has been particularly susceptible to this problem of feedback because the electric harmonica's generally desired sound (or tone) is made by taking high impedance omnidirectional microphones that were designed for radio broadcast and using them in a live performance situation with a high gain instrument amplifier.

When these existing ultra-sensitive "harmonica microphones" are used live and/or in conjunction with a hi-gain amplifier, feedback is introduced more quickly, and at lower volumes. As a result, electric harmonica players have not been able to play on stage at comparable volumes to other musicians without isolating themselves and the microphone from the amplified sound by standing in a different room, or a very long way away from the amplifier they have their microphone plugged into.

Further, because the design of these 'harmonica microphones' has the transducer (sound collector) exposed to the air, in order for the transducer to collect the harmonica's sound without feedback the harmonica player also needs to "cup" the microphone with his hands to protect the transducer form external sound waves, thereby prohibiting any hands-free use of such microphones.

As these problems associated with feedback and the harmonica microphone have been around for over fifty years, there have been some attempts in the past to come up with a solution. Some of the relevant prior art in this field are: U.S. Pat. No. 4,545,277 Sound attachment for a reed instrument by Strnad; U.S. Pat. No. 4,287,803, "Electric Mouth Organ Holder", by Zema; U.S. Pat. No. 2,664,775, "Harmonica Apparatus", by Zielinski; U.S. Pat. No. 2,945,408, "Harmonica and Microphone Pickup Therefor", by Terlinde, etc.

Each of the prior art devices listed above makes attempts to solve the problems addressed by the present disclosure. However, none has incorporated all of the right elements in a package that is both practical and commercial. As such, these prior inventions have not been accepted by the harmonica playing community, nor have they met with any wide commercial success.

The present disclosure improves significantly on the prior art in the areas that most matter to a performing harmonica player and musician. The harmonica is different from most instruments because the player cannot look to see physically where he is on the instrument because of the close proximity and disposition of the mouth and the eyes, and the involvement of the hand "cupping" the device. He must use his motor memory skills. The harmonica player gets to know where he is on the instrument by the position and shape of his hands next to his mouth, or where the harmonica lies, in the harmonica brace, in relation to his mouth. The prior art inventions listed above force the player to hold his harmonica and microphone in a very different manner to the way he is accustomed to holding it. This creates a situation whereby the musician must relearn how to play his instrument, something that is counter intuitive and prohibitive to producing good music.

SUMMARY

The present disclosure remedies the deficiencies of the prior art and allows the harmonica player to hold the microphone and harmonica comfortably as he is accustomed to doing in a universally standard way, i.e. between the forefinger and thumb of the left hand. The present disclosure also enables hands-free use of microphones, allowing the musician to play the harmonica and other instruments simultaneously, while performing, practicing, and/or recording. Specifically, the disclosure claims a hands-free harmonica microphone for controlling undesired audio feedback, the microphone comprising: a reflective curved microphone chamber, a harmonica mount, a transducer, associated electronics and a neck brace attachment apparatus for connecting the microphone to commercially available harmonica holders (neck braces). The harmonica mount may be detachably coupled to the microphone chamber in one embodiment. In another embodiment, the harmonica mount is integrated to the microphone chamber so that it is possible to mount the harmonica directly onto the microphone chamber. The harmonica mount, whether detachable, or integrated with the microphone chamber, enables the harmonica to be coupled with the microphone chamber. In addition to enabling hands-free performance, this also allows sealing off the transducer effectively from external sound waves that cause feedback.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION

Figure 1:
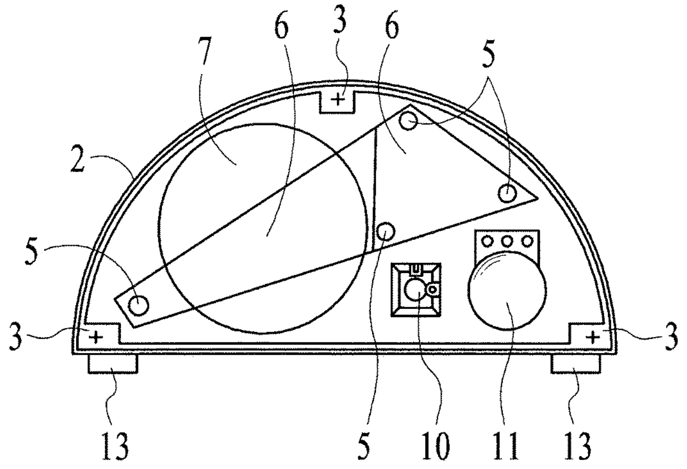
FIG. 1 is a top plan view of the microphone chamber, internal fittings and components, according to an embodiment of the present invention.

Embodiments of the present invention will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

The present disclosure allows the harmonica player to hold the microphone and harmonica comfortably as he is accustomed to doing in the universally standard way, i.e. between the forefinger and thumb of the left hand.

Embodiments of the present invention also have the ability to switch easily between hand-held and hands-free use with the use of its harmonica neck brace attachment apparatus. This is the first harmonica microphone to have such ability, which is a clear improvement over the existing art.

Another advantage of the present embodiment is that it is designed with wireless use in mind, giving the musician total freedom of movement on stage or in the studio while using the present embodiment both in the hands, or hands-free. This is the first harmonica microphone to have both wireless and hands-free function.

Yet another advantage shown by the embodiments of the present invention over the prior art is the magnetic harmonica mount. Both the Strnad and Terlinde patents mentioned in the background section above have harmonica mounting systems. However, they are prohibitive to professional use, being labor intensive and time consuming in contrast to the present embodiment's pop on and off magnetic harmonica mounting system.

In addition, embodiments of the present invention are lightweight, sleek in design and attractive in appearance, all bonuses in application and practicality for a performing musician. The performing musician is very aware of how he or she looks on stage. Visual aesthetic is a large part of show business. As opposed to the prior art, embodiments of the present invention appear almost invisible when used as a hand-held microphone and looks attractive to the viewer in the hands-free neck brace position.

Another very important factor in any musician's music is his 'tone'. A musician goes to great lengths to find a tone (sound) that inspires himself and feels good to the listener. In the case of the electric harmonica microphone, there are two key areas that impact tone greatly: (1) the transducer incorporated in the microphone used, and (2) the acoustic resonance and frequency response of that microphone's chamber. The present disclosure improves on the prior art by giving the musician the ability to choose and switch between transducers used in the microphone and hence allows the musician to customize the microphone to produce his desired tone. The present disclosure provides an internal fitting designed for easy attachment and use of custom-built or generic transducers, according to need. Examples of transducers include, but are not limited to, Shure transducer, a vintage ceramic transducer or a standard modern electret transducer. Thus, the present disclosure gives a wide range of sound choices for the musician and greatly increases the microphone's functionality.

In the field of electric harmonica amplification, in order to control feedback loops a musician must keep his volume down in relation to other musicians, cup his hands over the microphone and/or totally isolate them self from the amplifier they is using. All of these actions compromise a musician's desired sound, and can adversely affect performance. To address this, another significant improvement offered by the present disclosure over the prior art is the semicircular shaped microphone casing. This casing concentrates all of the harmonicas sound on the chosen transducer without the introduction of standing waves, feedback and other undesirable acoustic problems, while at the same time protecting the transducer from external, non direct sound waves that are the main cause of feedback loops. This in turn enables the musician to use greater volumes on stage and in the studio with more freedom and artistic expression. The casing can be made of reflective materials such as metal, medium density fiberboard (MDF), plastic, hard wood etc, or a combination thereof.

In short, this disclosure describes certain embodiments of the hands-free wireless harmonica microphone and details the implementation of the use of these embodiments to describe its functionality.

Referring to the drawings, the microphone casing shown in FIG. 1 includes a base (1) (labeled in FIG. 2), sidewall (2), mounts and screw taps (3) for securing the top plate (4) (labeled in FIG. 3), footings (5) for securing transducers (such as electret transducers or vintage ceramic transducer) and associated electronic circuits (6), a circular piece of foam rubber (7), used to seat transducers, and channels (15) cut through the front of the chamber (labeled in FIG. 4) to allow a harmonica's sound to enter the chamber.

Figure 2:
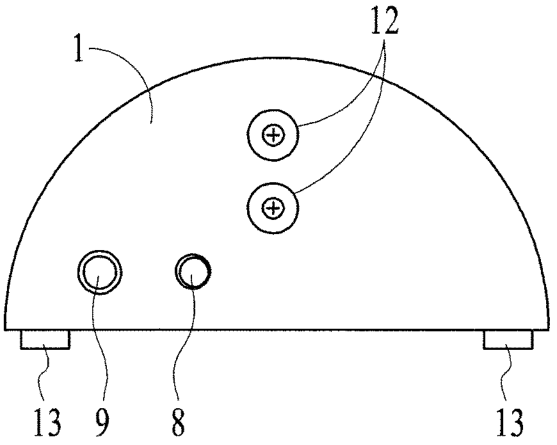
FIG. 2 is the bottom plan view of the microphone chamber.

The base (1) as seen in FIG. 2 is a semi circle, typically with a diameter of 4 and 5/16th of an inch. Persons skilled in the art would appreciate that this dimension, and other dimensions of components of the illustrative embodiments mentioned elsewhere are not limiting to the scope of the disclosure. The base contains holes (8)(9) for inserting a connector (10), such as a mini jack connector and volume potentiometer (11) respectively. Fastened to the base are two countersunk magnets (12), for example, of 3/8th inch diameter, used for attaching the neck brace attachment apparatus discussed below. Another two such magnets (13) are coupled to the front of the microphone chamber to be used in attaching the magnetic harmonica mount to the microphone chamber.

Figure 3:
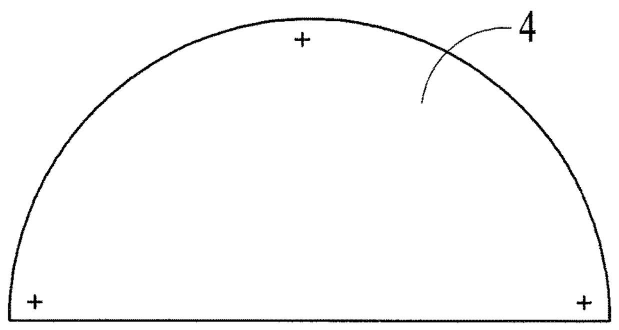
FIG. 3 is the top plan view of the microphone chamber's top plate that screws onto the microphone chamber.
Figure 4:
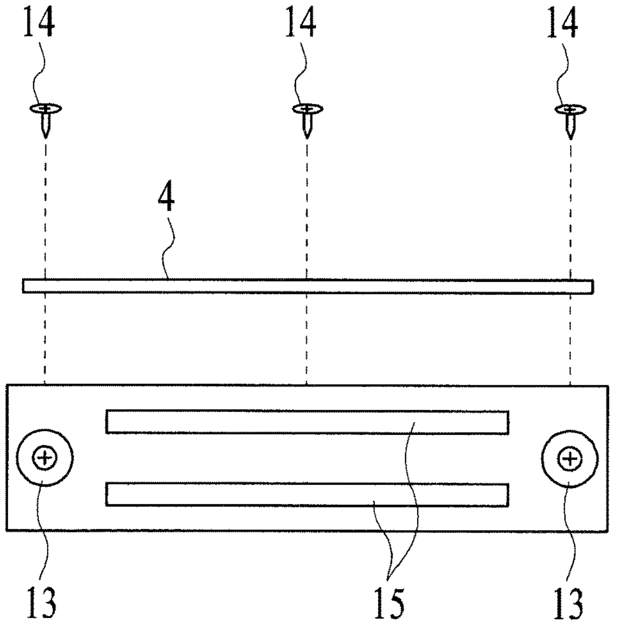
FIG. 4 is the front side view of the microphone chamber and attached magnets, with the top plate and screws shown separately as suspended above.

The microphone casing can be opened and closed from the top by adding or removing the top plate (4) seen in FIG. 3 with screws (14) as seen in FIG. 4, or with other coupling mechanism. The removal of the top plate reveals the internal components and allows the user to select a transducer and electric circuit. The transducer and electric circuits (6) are removed and attached either individually (for custom-built or third party commercially available transducers) or as a whole using the footings provided (5) on the base of the microphone chamber. The internal electronic components should not store a charge and while in use will only rate a maximum of 3V DC, thus being safe for a musician and/or a technician to handle.

Figure 12:
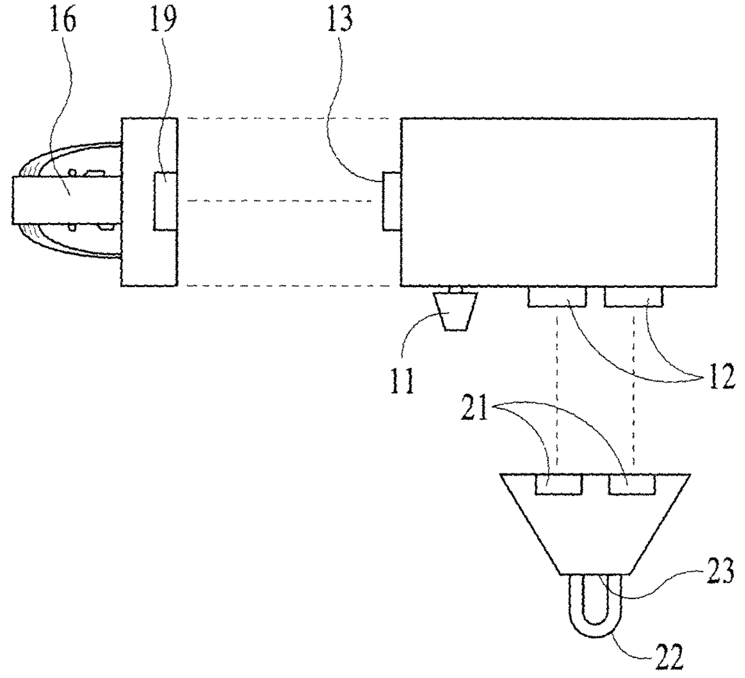
FIG. 12 is a side view of the complete hands-free, wireless harmonica microphone, showing how the magnetic harmonica holder and neck brace attachment apparatus connect to the microphone chamber, with a harmonica mounted in the holder.

Once the transducer and internal components have been selected and put in place, the top plate is attached (FIG. 4). The next step for the user of the microphone is to attach a harmonica (16) (shown in FIG. 12) to the front of the microphone casing via the magnetic harmonica mount shown in FIG. 5-8. Note that in the embodiment shown, the microphone chamber is separate from the harmonica mounting system. However, other embodiments are within the scope of this disclosure where microphone chamber and harmonica mount system are integrated. In the detachable harmonica mount configuration, the microphone chamber and the harmonica mount may be magnetically coupled. In certain embodiments, it is even possible to mount the harmonica directly onto the microphone chamber itself without an intermediate harmonica mount by modifying the design of the face of the microphone chamber to securely hold the harmonica.

Figure 5:
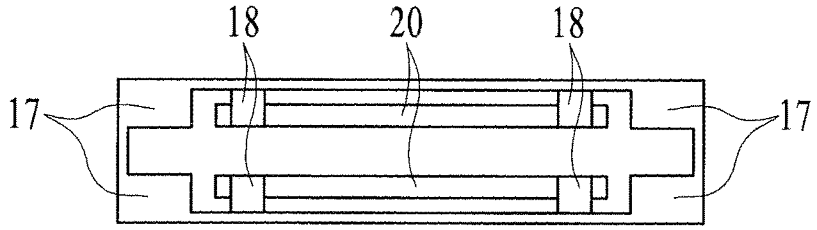
FIG. 5 is the front side view of the magnetic harmonica holder.
Figure 6:
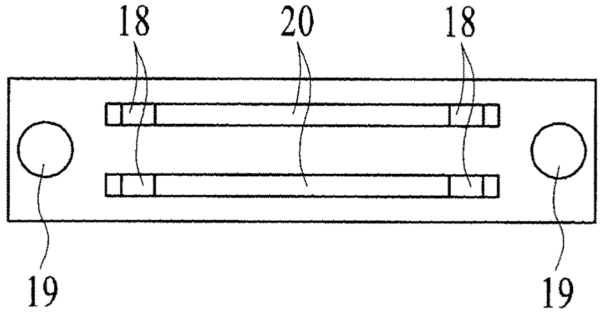
FIG. 6 is the back side view of the magnetic harmonica holder.
Figure 7:
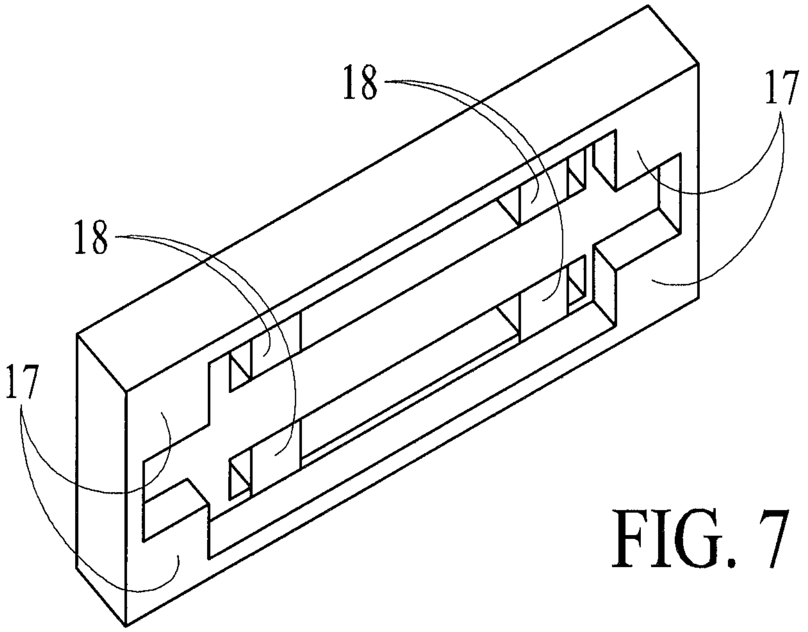
FIG. 7 is the front perspective view of the magnetic harmonica holder.
Figure 8:
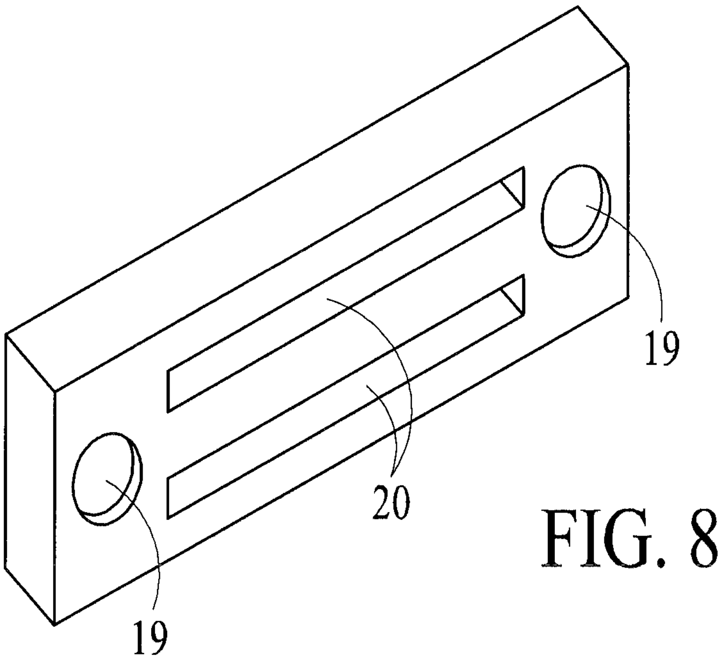
FIG. 8 is the rear perspective view of the magnetic harmonica holder.

As shown in FIGS. 5-6, the magnetic harmonica mount includes support blocks (17) on each side of the unit, spaced apart. In an example, there may be four support blocks with two on each side, spaced apart a distance of 3 9/32 of an inch horizontally, and 3/8ths of an inch vertically. The mount also includes four high-powered magnets, such as 1/4 inch neodymium magnets (18). In an embodiment, the magnets may be spaced apart two inches horizontally and 3/8th of an inch vertically. The magnetic harmonica mount comprises rubber, foam and felt that diffuses external sound waves.

To attach a harmonica, the user (i.e. the musician) places the harmonica so its back edge is contacting the magnets (18) of the magnetic harmonica holder while lining up the ends of the harmonica to fit between the support blocks (17). The metal cover plates found on all commercially available harmonicas are drawn to the magnets (18) in the mount. The combination of the magnets and support blocks is enough to keep the harmonica securely in place on the magnetic harmonica mount during any performance, yet the harmonica can be easily removed and replaced by hand.

The magnetic harmonica mount (FIGS. 5-8) is then attached to the front of the microphone chamber by connecting the magnets (13) found on the front of the microphone chamber with the magnets (19) embedded in the back of the magnetic harmonica mount. Once the magnetic harmonica mount is attached to the microphone chamber the channels (20) cut through the magnetic harmonica holder line up with the channels (15) cut through the microphone chamber, allowing sound from the harmonica to reach the transducer inside the microphone chamber.

Note that the present embodiment of the magnetic harmonica mount specifies dimensions that are specifically tailored for use with a standard diatonic harmonica. However different dimensions can easily be incorporated into future designs, catering to specific harmonica models, including both diatonic and chromatic harmonicas.

With the harmonica mounted via the magnetic harmonica mount to the microphone chamber, and the top plate being in position, the musician can amplify the microphone by connecting his wireless transmitter or chosen amplifier to the microphone chamber via the supplied connector, such as the mini jack (10). The microphone's output is now controlled by the volume potentiometer (11), which is adjusted from below the microphone.

Figure 9:
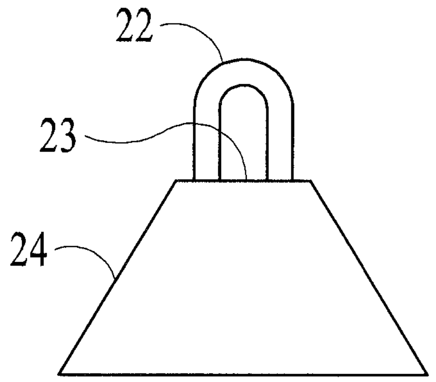
FIG. 9 is the side view of the neck brace attachment apparatus.
Figure 10:
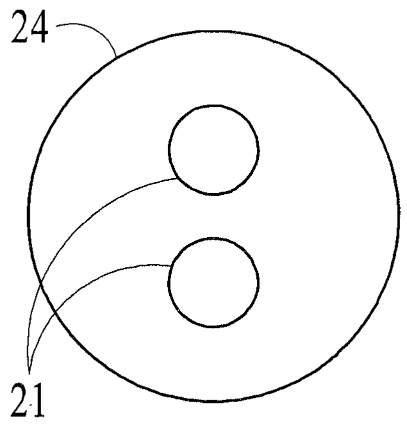
FIG. 10 is the bottom view of the neck brace attachment apparatus.
Figure 11:
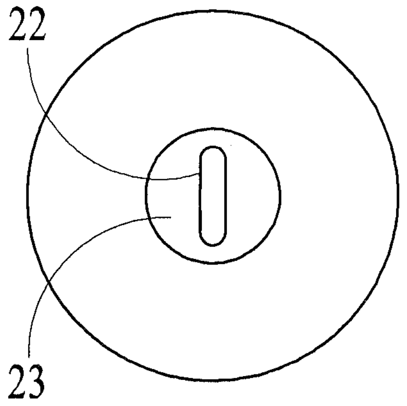
FIG. 11 is the top view of the neck brace attachment apparatus.

The musician optionally can continue using the microphone as a hand held microphone or attach the neck brace attachment apparatus, as shown in FIGS. 9-11, before connecting the microphone with a harmonica neck brace for hands-free use. The neck brace attachment apparatus as shown in FIG. 9-11 may be made of Acrylonitrile-Butadiene-Styrene (ABS) or other material. It may have various shapes, such as a conical shape with a platform on top (23) that seats the connecting loop (22).

The neck brace attachment apparatus is attached to the base of the microphone casing (1) by connecting the magnets (12) found on the base of the microphone chamber with the magnets (21) embedded in the base (24) of the neck brace attachment apparatus. The neck brace attachment apparatus can then be affixed to a commercially available harmonica holder (neck brace) via its connecting loop (22) using a wing nut and bolt or other suitable fastening mechanism.

While certain representative embodiments and details have been shown for purposes of illustrating the invention, it will be apparent to those skilled in the art that various changes in the methods and apparatus disclosed herein may be made without departing from the scope of the invention which is defined in the appended claims.

The inventive concepts have been described in terms of particular embodiments. Other embodiments are within the scope of the following claims. For example, the steps of the method embodiments can be performed in a different order and still achieve desirable results.

The invention claimed is:

1. A harmonica microphone for effective control of audio feedback, the microphone comprising:

a reflective microphone chamber with a flat semi-circular top plate, a flat semi-circular base, a sidewall, and a front wall, the sidewall and the front wall connecting the top plate and the base, wherein the microphone chamber includes internal mechanical fixture to securely house a first transducer that can be removed from the microphone chamber to be replaced by a second transducer; and a harmonica mount that enables a harmonica to be mounted on an external facet of the front wall of the microphone chamber, such that when the harmonica is mounted, the reflective microphone chamber becomes a substantially closed structure within which sound waves from the harmonica travel internally to be received by the housed first or second transducer isolated from external sound waves.

2. The microphone of claim 1, wherein the harmonica mount is distinct from the microphone chamber and is detachably coupled to the microphone chamber.

3. The microphone of claim 1, wherein the harmonica mount is integrated to the microphone chamber.

4. The microphone of claim 1, wherein the internal mechanical fixture of the microphone chamber comprises a footing and fittings that allow secure attachment and easy removal of the first transducer along with its associated electronics, to be replaced by the second transducer, where the first transducer and the second transducer produce different musical characteristics.

5. The microphone of claim 1, wherein when the harmonica is mounted, the substantially closed structure of the microphone chamber substantially reflects away and diffuses external sound waves, and concentrates internal sound waves received from the mounted harmonica going towards the housed first or second transducer.

6. The microphone of claim 1, wherein the sidewall connecting the top plate and the base follows the semi-circular curves that the top plate and the base have.

7. The microphone of claim 1, wherein the microphone chamber comprises one or more of the following reflective materials: metal, MDF, plastic, and wood.

8. The microphone of claim 1, wherein the housed first or second transducer is positioned in the microphone chamber such that the housed first or second transducer is substantially isolated from external sound waves once the harmonica is mounted.

9. The microphone of claim 1, wherein the harmonica mount comprises components whose dimensions are compatible with commercially available harmonicas for ease of mounting.

10. The microphone of claim 1, wherein support blocks on different sides of the harmonica mount are spaced apart to secure mounting of commercially available harmonicas.

11. The microphone of claim 1, wherein neodymium magnets on the harmonica mount are spaced apart to magnetically secure mounting of commercially available harmonicas.

12. The microphone of claim 1, wherein the harmonica mount comprises one or more of rubber, foam and felt that diffuse external sound waves.

13. The microphone of claim 1, wherein channels cut through the front wall of the microphone chamber align with channels cut through the harmonica mount to assist propagation of sound wave internally within the microphone chamber from a mounted harmonica toward the housed first or second transducer.

14. The microphone of claim 1, wherein the microphone further comprises: a neck brace attachment apparatus for coupling the microphone chamber to neck brace harmonica holders.

15. The microphone of claim 14, wherein the neck brace attachment apparatus has a connecting loop to adapt a commercial neck brace harmonica holder, and wherein the neck brace attachment apparatus is coupled to the microphone chamber.

16. The microphone of claim 5, wherein the substantially closed structure of the microphone chamber substantially isolates the housed first or second transducer from external sound waves once the harmonica is mounted.

17. The microphone of claim 1, wherein when the harmonica is mounted, the harmonica mount substantially seals off external air and sound waves from entering into the substantially closed structure of the microphone chamber.

18. The microphone of claim 1, wherein the harmonica mount comprises components whose dimensions are compatible with commercially available harmonicas for enhancing rejection and diffusion of external sound waves upon mounting of a commercially available harmonica.

* * * * *